United States Patent Office 2,947,388
Patented Aug. 2, 1960

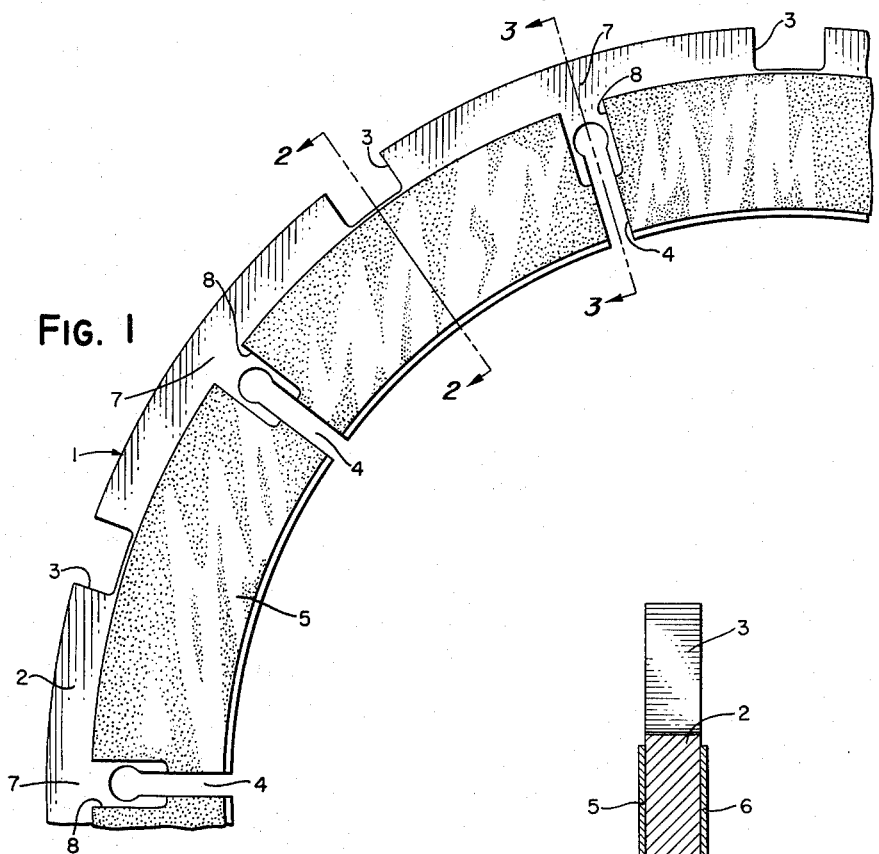
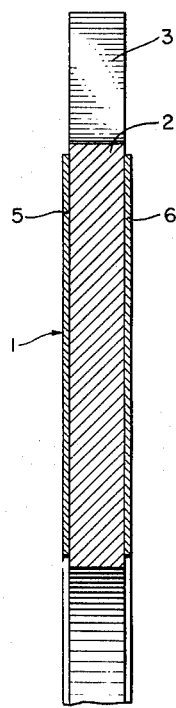
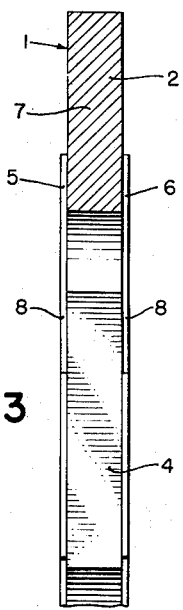

2,947,388
METALLURGICAL CONTROL DURING SINTERING

James A. Culbertson, Barberton, Ohio, assignor to The Goodyear Tire & Rubber Company, Akron, Ohio, a corporation of Ohio Filed Feb. 19, 1957, Ser. No. 641,130

2 Claims. (Cl. 188—218)

This invention relates to the sintering of a mass of powdered metal into permanent engagement with a body of base metal. It is especially useful where a face layer of sintered metal is to be applied to a soft sheet steel member without reducing the strength of the member. The invention is especially useful in the manufacture of brake discs for disc type brakes.

In the manufacture of brakes, especially for use on aircraft, rotatable discs of sheet metal are adapted to be driven by a rotating landing wheel while the discs are free to move axially of the wheel, the discs having a plurality of slots in their outer peripheries for engaging driving keys carried by the wheel. Brake shoes or other discs are non-rotatably mounted on a support carried by a stationary axle for frictional engagement with the rotating brake discs.

It has been found that the brake discs are distorted by the heat of frictional brake shoe application so as to become dished in use and in order to avoid excessive distortion, it has been found advisable to provide radial slots in the inner periphery of the discs to relieve the strain.

In order to provide greater wear resistance, at the faces of the discs, and to avoid a fusing braking surface, it has been found advantageous to provide a layer of sintered metal on each face of the disc where the disc is contacted by the shoes during a braking operation. The sintered metal facing is fused to the face of the disc at a high temperature and while this provides desirable non-fusing and wear resisting properties, it has been found that the sintering of the facing causes the underlying metal of the disc to be carbonized, or metallurgically changed. In some cases, this may be due to migration of ingredients at the interface. For example, when the materials are of ferrous metal, the underlying metal is carbonized, apparently due to migration of constituents of the sintered material into the underlying metal, causing the metal of the disc to become brittle and subject to breakage, especially where the cross-section of the disc is reduced as adjacent the strain-relieving notches.

It is an object of the present invention to overcome the foregoing and other difficulties.

Objects of the invention are to avoid migration of the constituents of the sintered material to the portions of the disc where great strength and durability is required, to provide a disc having sintered metal friction faces separated by connecting portions of ductile metal bridging the strain-relieving slots, and to provide a brake disc having increased life.

These and other objects will appear from the following descripton and the accompanying drawing forming a part thereof.

Of the drawing:

Fig. 1 is a side view of an annular brake disc constructed in accordance with and embodying the invention, part of the disc only being shown, other portions being broken away;

Fig. 2 is a sectional view thereof taken on line 2—2 of Fig. 1;

Fig. 3 is a similar sectional view taken on line 3—3 of Fig. 1.

Referring to the drawing, the numeral 1 designates an annular brake disc having a body 2 of sheet steel. The body 2 is formed with a plurality of outwardly open driving notches 3 about its outer periphery and a plurality of strain-relieving radial slots 4 open to its inner periphery. The body of the disc may be of a low carbon sheet steel. A typical material would be a steel having the following composition:

| | Percent |
|---|---|
| Nickel | .5 to 1.0 |
| Copper | .25 to .6 |
| Carbon | .1 to .12 |
| Iron | Balance |

The notches 3 and strain relieving slots 4 may be formed by punching or cutting them from the annular disc.

Facing layers 5, 6 of sintered ferrous material cover the friction faces of the disc over an annular zone of the disc radially wider than the depth of the slots 4 and are interrupted by the slots 4 which cross them, and, the layers 5, 6 are fused to the disc. These facings are formed by preparing a mixture of powdered materials, forming it under pressure to provide a compact, and fusing the compact to the surface of the disc body under heat and pressure. A suitable powder mixture might be:

| | Percent |
|---|---|
| Carbon | 3 to 8 |
| Molybdenum | .25 to .75 |
| Manganese | .15 to .6 |
| Nickel | .05 to .15 |
| Silicon | .05 to .20 |
| Chromium | .05 to .20 |
| Iron | Balance |

To provide greater ductility at the bridging portions 7, the compact of powdered material is formed with notches 8 at spaced intervals about its outer periphery at the positions of the bridging portions. These notches are of greater width than the rounded ends of the strain relieving slots so as to be well spaced circumferentially from such slots for the purpose of spacing the sintered material from the bridging portions by an amount sufficient to prevent migration of ingredients from the sintered material of the facing to the bridging portions. The notches 8 are made radially deep for the same purpose. The construction is such that during the fusing of the compact to the body of the disc or during any subsequent heat-treating or other heating of the disc, any ingredients of the sintered facing will be so remote from the bridging material opposite the strain relieving slots that substantially no carbonization of the material of the bridging portions occurs and those portions retain their original ductility and strength.

The disc with the sintered face layers thereon may be heat treated to provide the desired hardness of its face layers and is then ground on its flat faces to the desired thickness.

The compact of sintering material may be made conveniently as a continuous flat ring and so applied to the body of the disc. After fusing the resulting facing will span the slots 4 and the spanning portions may be broken away so as to divide the facing into a series of sectors each radially wider than the radial depth of the slots between the slots but of less radial width than the depth of the slots in the region of the slots due to the notches 8 in the outer periphery of the facing. The separation of the sectors of facing at the slots 4 in continuation of the notches 8 results in the radial outward corners of each sector being notched to space them well away from the connecting portions 7 so that no carbonization or other metallurgical change takes place in the connecting portion due to heat whether due to the sintering or fusing of the face layers, to heat treatment or to heat developed in use of the brake.

While a brake disc has been shown to illustrate the invention, other objects of steel having faces of sintered material may be constructed in similar manner within the invention.

While a certain representative embodiment and details have been shown for the purpose of illustrating the invention, it will be apparent to those skilled in the art that various changes and modifications may be made therein without departing from the spirit or scope of the invention.

I claim:

1. A brake disc of ferrous metal including an annular, flat, one-piece body of sheet metal of uniform thickness, said body having a plurality of strain-relieving slots extending radially therein from the inner periphery at points spaced equally circumferentially, the slots extending a majority of the distance through the body and terminating in enlarged circular ends of greater diameter than the circumferential width of the slots, a plurality of ferrous powdered metal sintered facings fused to both sides of the body, each facing extending near the inner periphery of the body from substantially the edge of one slot to the edge of the next but being spaced from substantially the radially outer half of each slot to prevent carbonization of the body adjacent the radially outer end of the slots from migration of the facing material during the sintering and fusing heat applied to the facings.

2. A brake disc of ferrous metal including an annular, flat, one-piece body of sheet metal of uniform thickness, said body having a plurality of strain-relieving slots extending radially therein from the inner periphery at points spaced equally circumferentially, the slots extending a majority of the distance through the body and terminating in enlarged circular ends of greater diameter than the circumferential width of the slots, a sintered facing of powdered ferrous metal fused to the body between each pair of adjacent slots, substantially the radially inner half of each facing extending from substantially slot to slot, substantially the radially outer half of each facing being spaced circumferentially from each slot and the circular end thereof to prevent carbonization of the body adjacent the radially outer end of the slots from migration of facing material during the sintering and fusing thereof.

References Cited in the file of this patent

UNITED STATES PATENTS

| | | |
|---|---|---|
| 2,178,527 | Wellman | Oct. 31, 1939 |
| 2,191,460 | Fisher | Feb. 27, 1940 |
| 2,207,961 | Wellman | July 16, 1940 |
| 2,289,689 | Wilson | July 14, 1942 |
| 2,457,861 | Brassert | Jan. 4, 1949 |
| 2,516,966 | DuBois | Aug. 1, 1950 |
| 2,553,828 | McCune | May 22, 1951 |
| 2,561,445 | McCune | July 24, 1951 |
| 2,792,624 | Muller | May 21, 1957 |
| 2,794,526 | Canfield | June 4, 1957 |
| 2,854,098 | Griswold | Sept. 30, 1958 |